United States Patent [19]

Sugiyama et al.

[11] Patent Number: 4,554,597

[45] Date of Patent: Nov. 19, 1985

[54] MEMORY UTILIZATION CONTROL SYSTEM FOR COMPRESSED DIGITAL PICTURE DATA TRANSMISSION SYSTEM

[75] Inventors: Hiroyuki Sugiyama, Isehara; Takeshi Shibamoto, Sagamihara; Hideo Sato, Yokohama; Tsuneo Furuki, Yamato; Mitsuo Kubo, Yamato; Koji Tanaka, Tokyo, all of Japan

[73] Assignee: Victor Company of Japan, Ltd., Japan

[21] Appl. No.: 548,415

[22] Filed: Nov. 3, 1983

[30] Foreign Application Priority Data

Nov. 5, 1982 [JP] Japan ................................. 57-194066

[51] Int. Cl.⁴ ........................ H04N 5/76; H04N 5/02
[52] U.S. Cl. .................................. 358/335; 358/140; 358/342
[58] Field of Search ............... 358/335, 339, 324, 310, 358/312, 313, 342, 907, 140, 11, 141; 360/10.1, 10.2, 10.3, 11.1

[56] References Cited

U.S. PATENT DOCUMENTS

| 4,018,990 | 4/1977 | Long et al. | 358/339 |
| 4,215,376 | 7/1980 | Mach | 358/339 |
| 4,277,796 | 7/1981 | Ross | 358/324 |
| 4,361,849 | 11/1982 | Bolger | 360/10.1 |
| 4,403,250 | 9/1983 | Kellar | 358/335 |
| 4,477,843 | 10/1984 | Kinjo et al. | 358/342 |

*Primary Examiner*—Donald McElheny, Jr.
*Attorney, Agent, or Firm*—Andrus, Sceales, Starke & Sawall

[57] ABSTRACT

An improved memory utilization control system for compressed digital picture data transmission systems, comprises an input terminal coupled to the memory circuit having a capacity of one frame, an address signal generator generating an address signal which successively indicates write-in addresses in first and second memory regions each amounting to one field in the memory circuit when picture element data of frame-transmission to be reproduced in the first and second fields are applied to the input terminal, and for generating two address signals which respectively and successively indicate write-in addresses in the first and second memory regions when picture element data of field-transmission are applied to the input terminal, a write-in pulse generator generating write-in pulses for writing the picture element data into the memory circuit, and a read-out control circuit for reading out stored picture element data from the first memory region during reproduction of the first field, and for reading out stored picture element data from the second memory region during reproduction of the second field, so that a total capacity of the memory circuit required otherwise is reduced drastically.

5 Claims, 15 Drawing Figures

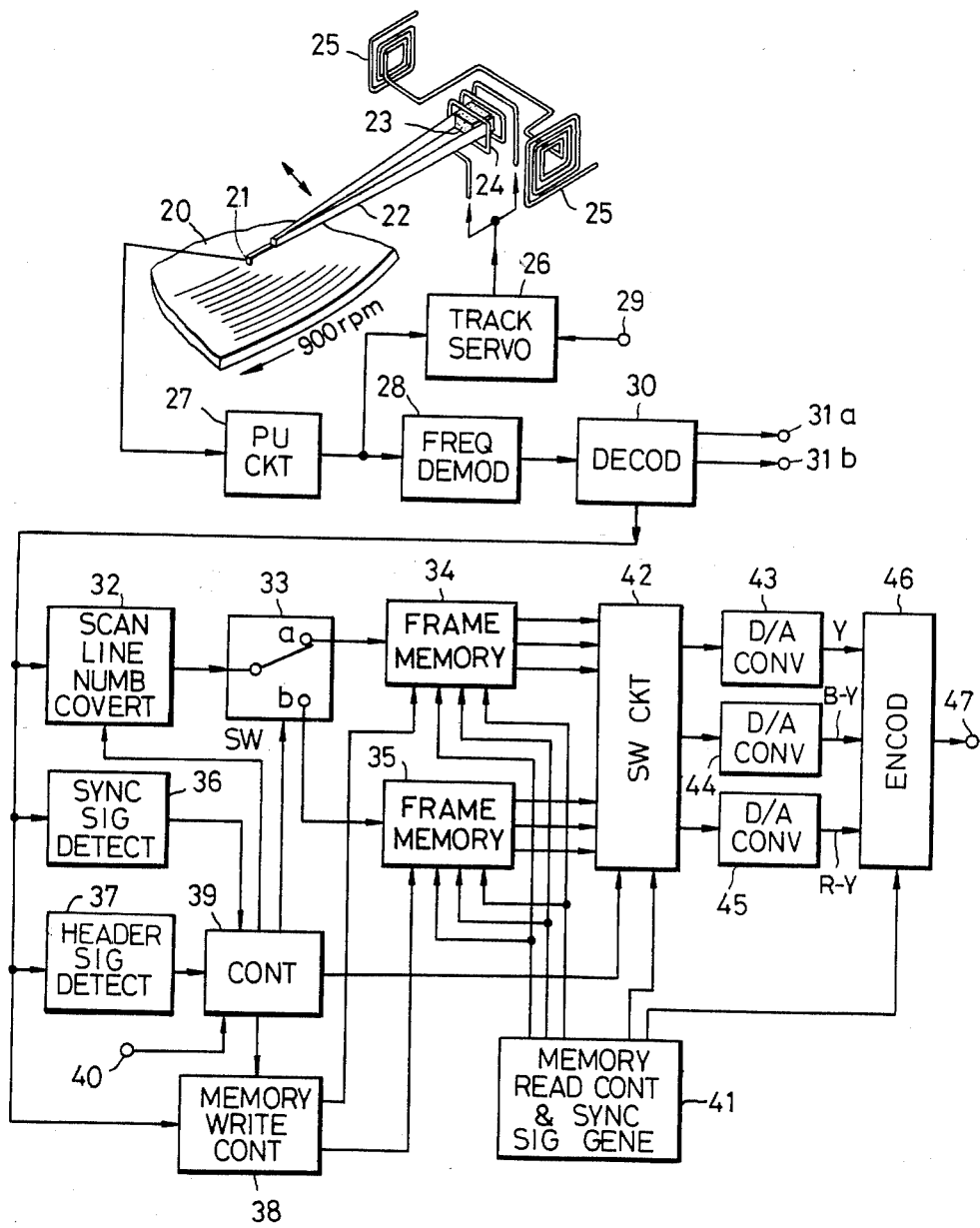

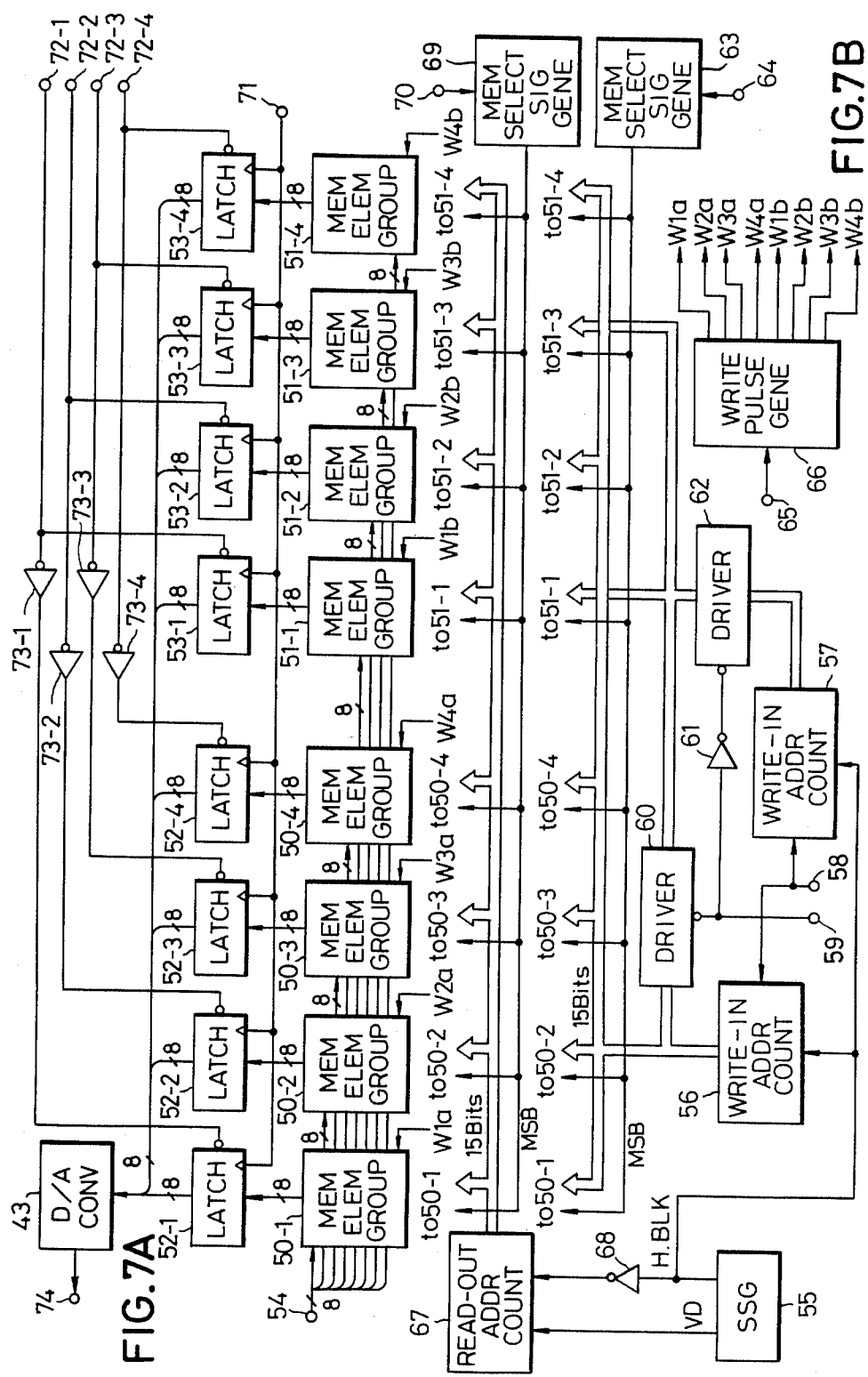

FIG.8A

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

FIG.8B 50-1, 50-2, 50-3, 50-4, 50-1, 50-2, 50-3, 50-4

| | 1 | 2 | 3 | 4 | 5 | 6 | 7 | 8 | |
|---|---|---|---|---|---|---|---|---|---|
| $0$ | 1 | 2 | 3 | 4 | 5 | 6 | 7 | 8 | $1$ |
| $2$ | 9 | 10 | 11 | 12 | 13 | 14 | 15 | 16 | $3$ |
| $4$ | 17 | 18 | 19 | 20 | 21 | 22 | 23 | 24 | $5$ |
| $6$ | 25 | 26 | 27 | 28 | 29 | 30 | 31 | 32 | $7$ |
| $0$ | 33 | 34 | 35 | 36 | 37 | 38 | 39 | 40 | $1$ |
| $2$ | 41 | 42 | 43 | 44 | 45 | 46 | 47 | 48 | $3$ |
| $4$ | 49 | 50 | 51 | 52 | 53 | 54 | 55 | 56 | $5$ |
| $6$ | 57 | 58 | 59 | 60 | 61 | 62 | 63 | 64 | $7$ |

| | 1 | 2 | 3 | 4 | 5 | 6 | 7 | 8 |
|---|---|---|---|---|---|---|---|---|
| #1 → | 1 | 2 | 3 | 4 | 5 | 6 | 7 | 8 |
| #2 → | 9 | 10 | 11 | 12 | 13 | 14 | 15 | 16 |
| #1 → | 17 | 18 | 19 | 20 | 21 | 22 | 23 | 24 |
| #2 → | 25 | 26 | 27 | 28 | 29 | 30 | 31 | 32 |
| #1 → | 33 | 34 | 35 | 36 | 37 | 38 | 39 | 40 |
| #2 → | 41 | 42 | 43 | 44 | 45 | 46 | 47 | 48 |
| #1 → | 49 | 50 | 51 | 52 | 53 | 54 | 55 | 56 |
| #2 → | 57 | 58 | 59 | 60 | 61 | 62 | 63 | 64 |

FIG. 9A

| 1 | | 2 | | 3 | | 4 | |
|---|---|---|---|---|---|---|---|
| | 5 | | 6 | | 7 | | 8 |
| 9 | | 10 | | 11 | | 12 | |
| | 13 | | 14 | | 15 | | 16 |
| 17 | | 18 | | 19 | | 20 | |
| | 21 | | 22 | | 23 | | 24 |
| 25 | | 26 | | 27 | | 28 | |
| | 29 | | 30 | | 31 | | 32 |

FIG. 9B 50-1, 50-2, 50-3, 50-4, 50-1, 50-2, 50-3, 50-4

Rows labeled 0, 2, 4, 6, 0, 2, 4, 6 (left) and 1, 3, 5, 7, 1, 3, 5, 7 (right)

| 1 | 5 | 2 | 6 | 3 | 7 | 4 | 8 |
|---|---|---|---|---|---|---|---|
| 9 | 13 | 10 | 14 | 11 | 15 | 12 | 16 |
| 17 | 21 | 18 | 22 | 19 | 23 | 20 | 24 |
| 25 | 29 | 26 | 30 | 27 | 31 | 28 | 32 |
| 9 | 5 | 10 | 6 | 11 | 7 | 12 | 8 |
| 17 | 13 | 18 | 14 | 19 | 15 | 20 | 16 |
| 25 | 21 | 26 | 22 | 27 | 23 | 28 | 24 |
| | 29 | | 30 | | 31 | | 32 |

| | | | | | | | | |
|---|---|---|---|---|---|---|---|---|
| #1→ | 1 | 5 | 2 | 6 | 3 | 7 | 4 | 8 |
| #2→ | 9 | 5 | 10 | 6 | 11 | 7 | 12 | 8 |
| #1→ | 9 | 13 | 10 | 14 | 11 | 15 | 12 | 16 |
| #2→ | 17 | 13 | 18 | 14 | 19 | 15 | 20 | 16 |
| #1→ | 17 | 21 | 18 | 22 | 19 | 23 | 20 | 24 |
| #2→ | 25 | 21 | 26 | 22 | 27 | 23 | 28 | 24 |
| #1→ | 25 | 29 | 26 | 30 | 27 | 31 | 28 | 32 |
| #2→ | | 29 | | 30 | | 31 | | 32 |

FIG. 10

| 1 | 10 | 3 | 12 | 5 | 14 | 7 | 16 |
|---|---|---|---|---|---|---|---|
| 17 | 26 | 19 | 28 | 21 | 30 | 23 | 32 |
| 33 | 42 | 35 | 44 | 37 | 46 | 39 | 48 |
| 49 | 58 | 51 | 60 | 53 | 62 | 55 | 64 |
| 9 | 2 | 11 | 4 | 13 | 6 | 15 | 8 |
| 25 | 18 | 27 | 20 | 29 | 22 | 31 | 24 |
| 41 | 34 | 43 | 36 | 45 | 38 | 47 | 40 |
| 57 | 50 | 59 | 52 | 61 | 54 | 63 | 56 |

MEMORY UTILIZATION CONTROL SYSTEM FOR COMPRESSED DIGITAL PICTURE DATA TRANSMISSION SYSTEM

BACKGROUND OF THE INVENTION

The present invention generally relates to write-in and read-out control apparatuses for controlling write-in and read-out of picture element data with respect to a memory circuit, and more particularly to a write-in and read-out control apparatus which is designed to write picture element data which are reproduced from an information signal recording medium and correspond to one frame into a frame memory with the picture element data unchanged, write picture element data which are reproduced from the information signal recording medium and correspond to one field into the frame memory with the picture element data duplicated, and read the picture element data which amount to one frame out from the frame memory in a predetermined sequence, so as to reproduce a still picture.

Generally, there is a known reproducing apparatus which reproduces a digital video signal recorded on tracks which are formed on a rotary recording medium (hereinafter simply referred to as a disc) as variations in rows of intermittent pits. The digital video signal is obtained by subjecting a video signal to a digital pulse modulation such as a pulse code modulation (PCM). As systems for reproducing the recorded digital video signal from such a disc, there is a system which reproduces the recorded signal in response to variations in the intensity of light reflected from or transmitted through the disc according to the variations in the pits formed on the disc, and a system which reproduces the recorded signal in response to variations in the electrostatic capacitance formed between a reproducing stylus and the disc according to the variations in the pits formed on the disc.

If the conventional digital video signal reproducing apparatus of the above type is designed to time-sequentially transmit a plurality of still picture information which are recorded on the disc, two frame memories are provided in the reproducing apparatus, for example. In such a reproducing apparatus, still picture information related to one or less frames are alternately written into these two frame memories. When one of the frame memories is writing therein a reproduced digital video signal, a reproduced digital video signal is read out from the other frame memory. The signal read out from the frame memory is successively passed through a digital-to-analog converter and an encoder, and then supplied to a television receiver which reproduces the signal as a picture.

The digital video signal which is related to the still picture and is recorded on the disc described above, comprises picture element data corresponding to one frame or picture element data corresponding to one field. The picture element data corresponding to one frame, consists of (114×4) picture element data related to the luminance signal, 114 picture element data related to the color difference signal (R−Y), and 114 picture element data related to the color difference signal (B−Y), which are respectively arranged in the scanning direction (horizontal direction of the picture), for example, and 525 picture element data related to the luminance signal, 525 picture element data related to the color difference signal (R−Y), and 525 picture element data related to the color difference signal (B−Y), which are respectively arranged in the vertical direction of the picture, for example.

On the other hand, if picture element data related to only one of the fields between a first (odd) field and a second (even) field are transmitted as the picture element data corresponding to one field, various problems were introduced. That is, compared to a reproduced still picture which is obtained according to the picture element data corresponding to one frame, the vertical resolution of a reproduced still picture which is obtained according to the picture element data corresponding to one field was poor. Moreover, the aliasing noise increased, and jitter was generated in the vertical direction. Thus, a novel information signal recording medium was proposed in a U.S. patent application Ser. No. 537,529, filed Sept. 30, 1983 and entitled "INFORMATION SIGNAL RECORDING MEDIUM AND REPRODUCING APPARATUS THEREFOR" in which the assignee is the same as the assignee of the present application. Picture element data which amount to one field and include some picture element data related to the first field and some picture element data related to the second field, are recorded on this proposed information signal recording medium. Accordingly, the picture element data which are reproduced from this proposed information signal recording medium may correspond to one frame, or amount to a total of one field in which picture element data related to $\frac{1}{2}$ the first field and picture element data related to $\frac{1}{2}$ the second field coexist.

The conventional frame memory in the reproducing apparatus described before, was designed to write in the reproduced picture element data in the sequence the picture element data were reproduced, regardless of whether the picture element data corresponded to one frame or one field. Thus, if the reproduced picture element data were picture element data corresponding to one frame, the reproduced picture element data were written into the frame memory to occupy its full memory capacity, and the stored picture element data were read out from the frame memory, the picture element data corresponding to one frame were reproduced so that all of the picture element data related to the second field were sequentially reproduced continuously after all of the picture element data related to the first field were sequentially reproduced. Hence, by repeating an operation in which the picture element data are read out from the frame memory with a field sequence which is the same as the field sequence with which the picture element data were written into the frame memory, it was possible to reproduce a still picture in a sequence which was in accordance with the field sequence of the standard television system.

However, when the reproduced picture element data amounted to a total of one field in which the picture element data related to $\frac{1}{2}$ the first field and the picture element data related to $\frac{1}{2}$ the second field coexisted, such reproduced picture element data amounting to one field were successively written into the frame memory in the reproduced sequence to occupy $\frac{1}{2}$ its memory capacity. In this case, in order to reproduce one still picture by reading out the stored picture element data from the frame memory, it was necessary to repeatedly read out the stored picture element data so that the picture element data which were read out amounted to a total of one frame. Consequently, the stored picture element data amounting to one field, were read out from the frame memory twice. However, if the stored picture element amounting to one field were simply read out from the frame memory twice, it was impossible to reduce the noise generated in the reproduced picture due to causes such as the aliasing noise and the deterioration in the vertical resolution. Therefore, it became necessary to make the read-out addresses of the stored picture element which amount to one field different during reproduction of the first field and during reproduction of the second field, so that the picture element data related to the first field and the picture element data related to the second field are alternately arranged and displayed on each of the scanning lines during the reproducing periods of the first and second fields, and so that the combinations of the arranged picture element data are different between the reproducing period of the first field and the reproducing period of the second field.

Accordingly, there was a problem in the conventional apparatus, in that the read-out sequence with which the stored picture element data are read out from the frame memory was different according whether the stored picture element data corresponded to one frame or to one field. The number of picture element data differs according to the size of the displaying area with respect to the total display area of the picture. In the present specification, the transmission of all of the picture element data which are related to the displaying area within the total display area of the picture, will be referred to as a "frame-transmission". On the other hand, the transmission of half the picture element data which are related to the displaying area within the total display area of the picture, will be referred to as a "field-transmission". Hence, if the displaying area is equal to the total display area of the picture, the number of picture element data will amount to one frame in the case of frame-transmission, and the number of picture element data will amount to one field in the case of field-transmission. A special type of field-transmission in which half the total picture element data which are related to the displaying area are made up from picture element data related to the first field, and half the total picture element data which are related to the displaying area are made up from picture element data related to the second field, for example, will be particularly referred to as a "zigzag-transmission". Thus, if the displaying area is equal to the total display area of the picture in the case of the zigzag-transmission, the picture element data related to ½ the first field and the picture element data related to ½ the second field coexist to make up the picture element data which amount to one field.

According to the contents of the picture, there are cases where it is desirable to compose a still picture which is determined by the picture element data of frame-transmission and a still picture which is determined by the picture element data of field-transmission, to display these two still pictures in one picture. In such cases, the picture element data of frame-transmission and the picture element data of field-transmission which amount to a total of one frame, were written into a single frame memory, in a state where the picture element data of frame-transmission and the picture element data of field-transmission coexisted. Especially when displaying the picture which is determined by the picture element data of the field-transmission on a small display area within the still picture which is determined by the picture element data of frame-transmission, it was possible to move the picture which is determined by the picture element data of field-transmission and is displayed on the small display area, because the transmission period of the picture element data of field-transmission was shorter than the transmission period which was required to transmit picture element data amounting to one field due to the small display area these picture element data of field-transmission cover. Therefore, it was possible to display a so-called partially moving picture.

However, as described previously, the read-out sequences with which the picture element data of frame-transmission and the picture element data of field-transmission were read out from the frame memory, were different in the conventional apparatus. Moreover, when the picture element data of frame-transmission and the picture element data of field-transmission were written into a single frame memory so that the picture element data of frame-transmission and the picture element data of field-transmission coexisted, it was impossible to discriminate which address region of the frame memory actually stored the picture element data of field-transmission. Therefore, there was a disadvantage in that the stored picture element data could not be read out from the frame memory in a particular read-out sequence which was intended for particular picture element data.

SUMMARY OF THE INVENTION

Accordingly, it is a general object of the present invention to provide a novel and useful write-in and read-out control apparatus for controlling write-in and read-out of picture element data with respect to a memory circuit, in which the above described disadvantages have been overcome.

Another and more specific object of the present invention is to provide a write-in and read-out control apparatus which carries out control so that each picture element data of field-transmission is written into a frame memory twice to occupy the full memory capacity of the frame memory, in order to substitute the picture element data of field transmission for picture element data corresponding to one field which is not transmitted, and carries out control so that the stored picture element data of field-transmission are read out from the frame memory with the same read-out sequence with which stored picture element data of frame-transmission would be read out from the frame memory.

Still another object of the present invention is to provide a write-in and read-out control apparatus which carries out control so that each picture element data of frame-transmission which amount to less than one frame is successively written at an address in a frame memory in a predetermined sequence, and each picture element data of field-transmission which amount to less than one field is successively written at two addresses in the frame memory in a predetermined sequence, so that picture element data in which the picture element data of frame-transmission and the picture element data of field-transmission coexist and amount to a total of one frame are written into the single frame memory, and carries out control so that stored picture element data which amount to one frame are read out from the frame memory with a predetermined read-out sequence. According to the apparatus of the present invention, it is unnecessary to discriminate whether the picture element data are to be read out from the frame memory are picture element data of frame-transmission or of field-transmission, and the stored picture element data can always be read out from the frame memory with the same read-out sequence. Hence, it is possible to compose and display a still picture which is reproduced from the picture element data of field-transmission within a still picture which is reproduced from the picture element data of frame-transmission. If the still picture which is reproduced from the picture element data of field-transmission relates to a small displaying area with respect to the total display area of the picture, the picture which is reproduced from the picture element data of field-transmission can be displayed as a partially moving picture within the high-quality still picture which is reproduced from the picture element data of frame-transmission, by repeating an operation in which the picture element data of field-transmission are renewed and then read out.

A further object of the present invention is to provide a write-in and read-out control apparatus which carries out control so that each picture element data of zigzag-transmission which is displayed on a displaying area within one picture (one frame) is written into a frame memory twice in a predetermined write-in sequence to occupy the full memory capacity of the frame memory, and carries out control so that the stored picture element data of zigzag-transmission are read out from the frame memory with the same read-out sequence with which stored picture element data of frame-transmission would be read out from the frame memory. According to the apparatus of the present invention, it is possible to obtain a reproduced picture in which the deterioration in the vertical resolution and the jitter in the vertical direction of the picture are greatly reduced as compared to the deterioration seen in the conventional apparatus, because the picture element data of zigzag-transmission are written into and read out from the frame memory.

Other objects and further features of the present invention will be apparent from the following detailed description when read in conjunction with the accompanying drawings.

BRIEF DESCRIPTION OF THE DRAWINGS

FIG. 6 is a systematic block diagram showing an example of a reproducing apparatus which comprises a write-in and read-out control apparatus according to the present invention;

FIG. 7A is a systematic circuit diagram showing an embodiment of a write-in and read-out control apparatus according to the present invention;

FIG. 7B shows a write pulse generator which supplies write pulses to each of memory element groups in the block system shown in FIG. 7A;

FIG. 8A shows an example of positions of picture element data of frame-transmission in a picture, which picture element data of frame-transmission are to be written into a memory circuit under the control of the apparatus according to the present invention;

FIG. 8B shows an example of address locations of stored picture element data of frame-transmission in the memory circuit, which picture element data of frame-transmission are written into the memory circuit under the control of an embodiment of the apparatus according to the present invention;

FIG. 8C shown an example of display positions of picture element data on a reproduced picture, which picture element data are read out from the memory circuit under the control of the apparatus according to the present invention;

FIG. 9A shows an example of positions of picture element data of field-transmission in a picture, which picture element data of field-transmission are to be written into a memory circuit under the control of the apparatus according to the present invention;

FIG. 9B shows an example of address locations of stored picture element data of field-transmission in the memory circuit which picture element data of field-transmission are written into the memory circuit under the control of an embodiment of the apparatus according to the present invention;

FIG. 9C shows an example of display positions of picture element data on a reproduced picture, which picture element data are read out from the memory circuit under the control of the apparatus according to the present invention; and FIG. 10 shows address locations of picture element data of frame-transmission in the memory circuit, which picture element data of frame-transmission are written into the memory circuit under the control of another embodiment of the apparatus according to the present invention.

DETAILED DESCRIPTION

Figure 1:
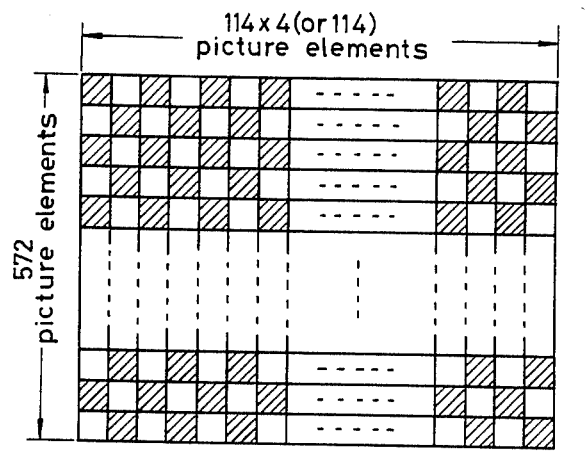
FIG. 1 shows an example of original display positions of picture element data of zigzag-transmission on a screen, which picture element data of zigzag-transmission are to be written into a memory circuit under control of a write-in and read-out control apparatus according to the present invention.

FIG. 1 shows an example of original display positions of picture element data of zigzag-transmission on a screen, which picture element data of zigzag-transmission are to be written into a memory circuit (frame memory) under control of a write-in and read-out control apparatus according to the present invention. With respect to the picture element data related to the luminance signal, one picture (one frame) is made up from a matrix arrangement of ($114 \times 4$) picture element data in the horizontal direction and 572 picture element data in the vertica direction, as described before. With respect to each of the two kinds of color difference signals, one picture is made up from a matrix arrangement of 114 picture element data in the horizontal direction and 572 picture element data in the vertical direction, since the sampling frequencies of the two kinds of color difference signals are respectively $\frac{1}{4}$ the sampling frequency of the luminance signal. Among these picture element data which make up one picture, the picture element data which are arranged in the checkered pattern as indicated by squares with oblique hatchings in FIG. 1 and amount to a total of one field, are transmitted upon zigzag-transmission. However, when the picture element data are to be displayed within only a part of the picture, the picture element data of zigzag-transmission will no amount to one field. In such a case, the number of picture element data of zigzag-transmission corresponds to the displayin area within the picture, and only the picture element data which are arranged in the checkered pattern within a part which corresponds to the displaying area are transmitted.

On the other hand, when transmitting picture element data corresponding to one frame in the case of frame-transmission, all of the picture element data which are indicate by squares with and without the oblique hatchings in FIG. 1 are transmitted. However, even in this case of frame-transmission, if the picture is composed and displayed together with another picture which occupies a certain displaying area within the picture, the number of picture element data of frame-transmission will similarly correspond to a displaying area of the picture excluding the certain displaying area of the other picture, and only the picture element data which are arranged within a part which corresponds to the displaying area of the picture excluding the certain display area are transmitted.

The picture element data which are supplied to a frame memory which is controlled by the write-in and read-out control apparatus according to the present invention, are supplied to the frame memory through various transmission paths including an information signal recording medium. As an example, description will be given hereinafter on the assumption that the picture element data are recorded onto and reproduced from a disc which is disclosed in a U.S. patent application Ser. No. 485,054 entitled "DIGITAL VIDEO SIGNAL RECORDING SYSTEM AND REPRODUCING APPARATUS" filed April 14, 1983 in which the assignee is the same as the assignee of the present application.

Therefore, description will first be given with respect to the digital video signal recording system and reproducing apparatus disclosed in the above U.S. patent application Ser. No. 485,054. According to this recording system, a digital video signal in which a product of the number of luminance picture elements in one scanning line and the number of effective scanning lines in one picture of a standard television system is selected to a value exceedingly close to $2^{18}$ but not exceeding $2^{18}$, is time-sequentially multiplexed with a digital audio signal and recorded onto a recording medium. Thus, a memory circuit in the reproducing apparatus which reproduces the recorded signals from this recording medium, which stores the reproduced digital video signal, may be made up from generally marketed memory elements. Moreover, one address signal generating circuit may be used in common for each of the memory elements in the memory circuit.

Figure 2:
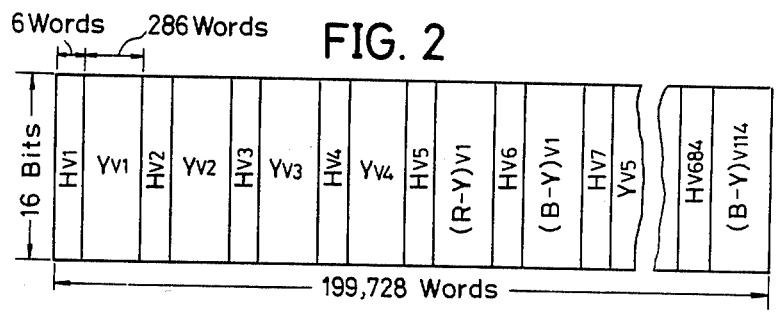
FIG. 2 shows an example of a signal format of a digital video signal which is supplied to a memory circuit.

It will be assumed that the digital video signal which is recorded on a digital audio disc together with the digital audio signal, is recorded with a signal format shown in FIG. 2, for example. FIG. 2 shows the signal format of the digital video signal which corresponds to one frame. The digital video signal corresponding to one frame is made up of 684 header signals $H_{V1}$ through $H_{V684}$, and component coded signals $Y_{V1}$, $Y_{V2}$, $Y_{V3}$, $Y_{V4}$, $(R-Y)_{V1}$, $(B-Y)_{V1}$, ..., and $(B-Y)_{V114}$ which relate to a color still picture, for example.

Description will first be given with respect to the component coded signal. Among the color video signal having 625 scanning lines, a horizontal scanning frequency of 15.625 kHz, and corresponds to one frame, only the signal within the video period is divided into the luminance signal and the color difference signals $(R-Y)$ and $(B-Y)$ and transmitted. The luminance signal is sampled at a sampling frequency of 9 MHz and quantized with a quantization number of 8 bits. On the other hand, the two kinds of color difference signals $(R-Y)$ and $(B-Y)$ are each sampled at a sampling frequency of 2.25 MHz and quantized with a quantization number of 8 bits. As disclosed in the U.S. application Ser. No. 485,054, the number of sampling points (picture elements) of the luminance signal in one scanning line is set to 456, so that the product of the number of picture elements and the number of effective scanning lines assumes a value which is exceedingly close to $2^{18}$ but less than $2^{18}$. In addition, the number of effective scanning lines is set to 572 for one frame. Accordingly, the numbers of picture elements of the two kinds of digital color difference signals $(R-Y)$ and $(B-Y)$ in one scanning line, each become equal to 114.

By use of a memory circuit, the digital luminance signal becomes a signal having a sampling frequency of 88.2 kHz and a quantization number of 8 bits, and the two kinds of digital color difference signals each become a signal having a sampling frequency of 88.2 kHz and a quantization number of 8 bits. The header signal is a digital signal having a sampling frequency of 44.1 kHz and a quantization number of 16 bits. Hence, if one word is made up of 16 bits, two picture element data can be transmitted in one word.

In FIG. 2, the digital video signal corresponding to one frame comprises a total of 199,728 words. The picture element data groups $Y_{V1}$ through $Y_{V456}$ of the digital luminance signal each made up of 286 words, the picture element data groups $(R-Y)_{V1}$ through $(R-Y)_{V114}$ and $(B-Y)_{V1}$ through $(B-Y)_{V114}$ of the digital color difference signals each made up of 286 words, and a total of 684 header signals $H_{V1}$ through $H_{V684}$ each made up of 6 words and multiplexed to the beginning of each of the picture element data groups, are time-sequentially multiplexed in this digital video signal corresponding to one frame.

Figure 3:
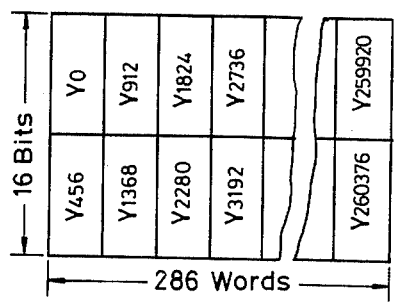
FIG. 3 shows an example of a signal format of picture element data groups in the signal format shown in FIG. 2.

A total of 572 luminance picture element data groups in the first vertical column at the leftmost part of the screen are indicated by $Y_{V1}$, and each of the picture element data are arranged in sequence from the top of the screen to the bottom of the screen. As shown in FIG. 3, the picture element data $Y_0$ at the uppermost part of the screen is arranged in the upper 8 bits of the first word, and the picture element data $Y_{456}$ at the second uppermost part of the screen is arranged in the lower 8 bits of the first word. Similarly, the picture element data $Y_{912}$ is arranged in the upper 8 bits of the second word, the picture element data $Y_{1368}$ is arranged in the lower 8 bits of the second word, the picture element data $Y_{1824}$ is arranged in the upper 8 bits of the third word, ..., and the picture element data $Y_{260376}$ at the lowermost part of the screen is arranged in the lower 8 bits of the 286-th word. A total of 572 luminance picture element data groups in the second column from the left end of the screen are indicated by $Y_{V2}$, and a total of 572 luminance picture element data groups in the third column from the left end of the screen are indicated by $Y_{V3}$. Similarly, a total of 572 luminance picture element data groups in the i-th (i is an integer from 1 to 456) column from the left end of the screen are indicated by $Y_{Vi}$. Each of the picture element data are arranged similarly as the above picture element data group $Y_{V1}$, and the picture element data corresponding to one vertical column are transmitted by 286 words.

In addition, a total of 572 picture element data groups of the first digital color difference signal arranged in the j-th (j is an integer from 1 to 114) column from the left end of the screen are indicated by $(R-Y)_{Vj}$, and a total of 572 picture element data groups of the second digital color difference signal arranged in the j-th column from the left end of the screen are indicated by $(B-Y)_{Vj}$. Each of the 572 picture element data groups corresponding to one column are arranged in a sequence starting from the top to the bottom of the screen in the upper 8 bits of the first word, lower 8 bits of the first word, upper 8 bits of the second word, lower 8 bits of the second word, upper 8 bits of the third word, . . . , and lower 8 bits of the 286-th word, and the picture element data corresponding to one column are transmitted by 286 words. A header signal having six bits, for example, is added to the beginning of each of the above divided picture element data groups.

Further, as shown in FIG. 2, the above component coded signal has a signal format in which the signal is time-sequentially transmitted in terms of units, where one unit comprises a total of six picture element data groups, that is, four picture element groups $Y_{V(4j-3)}$, $Y_{V(4j-2)}$, $Y_{V(4j-1)}$, and $Y_{V(4j)}$ and the two kinds of digital color difference signals $(R-Y)_{Vj}$ and $(B-Y)_{Vj}$.

Figure 4:
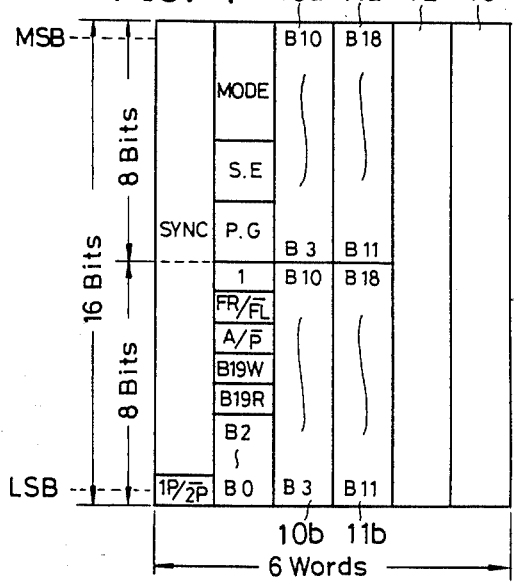
FIG. 4 shows an example of a signal format of a header signal in the signal format shown in FIG. 2.

Next, description will be given with respect to the signal format of the header signals $H_{V1}$ through $H_{V684}$, by referring to FIG. 4. The header signals $H_{V1}$ through $H_{V684}$ are each made up of six words. In FIG. 4, the arrangement of the bits is shown in the vertical direction, where the uppermost bit represents the most significant bit (MSB) and the lowermost bit represents the least significant bits (LSB). The words are shown in the horizontal direction. The first word of the header signal comprises a synchronizing signal which consists of upper fifteen bits which are all "1", and a 1-bit transmission channel identification code represented by "1P/$\overline{2P}$" which is located at the LSB. The transmission channel identification code identifies the channels which are used to transmit the digital video signal, among the four transmission channels. When this transmission identification code is "1P", that is, when "1", it is identified that the digital video signal is transmitted in the fourth channel. On the other hand, when the transmission channel identification code is "2P", that is, when "0", it is identified that two channels, namely, the third and fourth channels, are used to transmit the digital video signal. In the present embodiment, it will be assumed that the transmission channel identification code is "2P", that is, "0". When the transmission channel identification code is "2P", the kind of picture to which the digital video signal relates, may be made mutually different in the third and fourth channels. The kind of picture may be pictures such as a scenery, portrait, and a scene showing a musician play. By making the kinds of pictures which are transmitted in the third and fourth channels different from each other, it becomes possible for the viewer to select his preference. However, in the present embodiment, the third and fourth channels each transmit one word of the same picture. That is, the sampling frequency is equivalently doubled by this transmission method.

Various identification codes are transmitted in the second word of the header signal. A 4-bit picture mode identification code represented by "MODE", is located in the upper four bits in the second word of the header signal. This picture mode identification code identifies whether the digital video signal which is to be recorded relates to a regular still picture (the description given before in conjunction with FIG. 2 was an example of the case where the digital video signal which is to be recorded relates to this regular still picture), a moving picture using a run-length code, a high definition still picture with 1125 scanning lines, or the like. A 2-bit special effect identification code represented by "S.E." is located in the subsequent fifth and sixth bits among the upper 8 bits in the second word of the header signal. This special effect identification code identifies special effects such as fade-in, and changing of the picture from the top or left of the picture, with respect to the still picture.

A 2-bit picture category identification code represented by "P.G.", is located in the subsequent seventh and eighth bits among the upper 8 bits. When the third and fourth channels are used to transmit independent digital video signals, a normal picture is transmitted in the fourth channel, for example. Then, a special picture in which various kinds of digital video signals are time-sequentially multiplexed, is transmitted in the third channel. In such a case, the picture category identification code indicates the value of a category number which is assigned to each of the various categories of pictures (the maximum number of categories is four in the present embodiment) transmitted in the third channel. Each of the pictures transmitted in the third channel must have continuity when displayed, and are pictures (musical scores, scenery, illustrations, scene showing a musician play, and the like, for example) which should not be changed to another picture before their display is completed. The picture category identification code identifies the category number which is assigned according to the category of the picture. Accordingly, when the viewer selects to reproduce the picture of the third channel and specifies a desired category number, only the picture corresponding to the specified category number is continuously reproduced, and the picture corresponding to that specified category number is prevented from being interrupted by pictures corresponding to other category numbers.

The ninth bit, that is, the first bit among the lower eight bits, of the second word which is represented by "1", indicates a binary "1". This ninth bit is provided so as to prevent all the 16 bits in the second word from becoming "0" when the values of the various codes all become "0". A 1-bit picture information quantity identification code represented by "FR/$\overline{FL}$", is located at the tenth bit of the second word of the header signal. This picture information identification code identifies whether the digital video signal which is to be transmitted corresponds to one frame or one field. It is identified that the digital video signal corresponds to one frame when this picture information quantity identification code is "1", and on the other hand, that the digital video signal corresponds to one field when the picture information quantity identification code is "0". The signal format of the video signal part differs according to whether the digital video signal is transmitted in terms of frames or fields. Accordingly, the reproducing apparatus detects the picture information quantity identification code, to carry out the write-in of the video signal in accordance with the signal format used.

A 1-bit picture transmission identification code represented by "A/$\overline{P}$", is located at the eleventh bit of the second word of the header signal. When this picture transmission identification code is "1", it is identified that the digital video signal which is to be transmitted relates to a still picture which should be displayed in full on the screen (so-called full-picture transmission). On the other hand, if the picture transmission identification code is "0", it is identified that the digital video signal which is to be transmitted relates to a picture which should be displayed on a part of the screen by the so-called partial rewriting of the digital video signal.

A 1-bit write-in specifying code represented by "B19W", is located at the twelfth bit of the second word of the header signal. A 1-bit read-out specifying code represented by "B19R", is located at the thirteenth bit in the second word of the header signal. These write-in and read-out specifying codes are provided with respect to two memories within the reproducing apparatus which will be described hereinafter in conjunction with FIGS. 6 and 7. When the write-in and read-out specifying codes are both "0" (or "1"), the picture element data of the digital video signal are written into a first (or second) memory, and the stored picture element data are read out and displayed on the screen. This means that the content of the picture is changed while displaying the picture, and as a result, it is possible to display a moving picture at a part of the still picture which is being displayed. On the other hand, when the write-in specifying code is "0" and the read-out specifying code is "1", the picture element data read out from a second memory are displayed while the picture element data are written into the first memory. In this case, the display on the screen is changed to the display or the picture element data read out from the first memory from the display of the picture element data read out from the second memory, according to an end-of-data signal, after the write-in with respect to the first memory is completed. The end-of-data signal is a one-word signal which is added to the terminal part of the digital video signal. Further, when the write-in specifying code is "1" and the read-out specifying code is "0", the picture element data read out from the first memory are displayed while the picture element data are written into the second memory.

Three 1-bit memory identification codes represented by "B2" through "B0", are located in the fourteenth through sixteenth bits of the second word. Twelve columns of memory element groups are in frame memories 58 and 59 within the reproducing apparatus which will be described hereinafter in conjunction with FIGS. 6 and 7. The three memory identification codes identify which column of memory element groups is to store the picture element data groups transmitted immediately subsequent to the header signal.

The picture element data groups of the digital luminance signal are stored in the first through fourth and seventh through tenth columns of memory element groups. The picture element data groups of the first digital color difference signal are stored in the fifth and eleventh columns of memory element groups, and the picture element data of the second digital color difference signal are stored in the sixth and twelfth columns of memory element groups.

A third word of the header signal consists of upper 8 bits 10a and lower 8 bits 10b. The upper 8 bits 10a comprises bits B3 through B10, and the lower 8 bits 10b comprises bits B3 through B10. A fourth word of the header signal consists of upper 8 bits 11a and lower 8 bits 11b. The upper 8 bits 11a comprises bits B11 through B18, and the lower 8 bits 11b comprises bits B11 through B18. These third and fourth words of the header signal are 16-bit address codes, and indicate an address in the memory circuit for storing the first picture element data corresponding to the upper 8 bits of the first word in the video signal part which is transmitted subsequent to the header signal. The bits B3 through B10 indicate the lower byte of the address code, and the bits B11 through B18 indicate the upper byte of the address code.

The television signals used throughout the world either have 625 scanning lines or 525 scanning lines. And, although the digital video signal is a time-sequentially multiplexed signal of picture element data of 572 scanning lines which actually include the picture information, the digital video signal is transmitted under the 625-line system. Accordingly, if reproduction is to be carried out under the 525-line system, the number of scanning lines must be converted in the reproducing apparatus before storing the picture element data into the memory circuit. Thus, the address signal for this memory circuit must assume two different addresses with respect to the 625-line system and the 525-line system. Hence, the bits "B3" through "B18" in the upper 8 bits 10a and 11a, indicate the address of picture element data in the upper 8 bits of the first word of the video signal part in the 625-line system. On the other hand, the bits "B3" through "B18" in the lower 8 bits 10b and 11b, indicate the address of the picture element data in the upper 8 bits of the first word of the video signal part in the 525-line system obtained by the conversion of the number of scanning lines.

A fifth word 12 and a sixth word 13 of the header signal, are spare words. Normally, these words 12 and 13 are all "0". Because it is known beforehand that these two words are all "0", these two words are not detected in the reproducing apparatus. The reproducing apparatus then goes on to detect the next picture element data group.

When transmitting the picture element data which amount to one field by the zigzag-transmission shown in FIG. 1, the signal format of the digital video signal is basically the same as the signal format shown in FIG. 2. In other words, the number of header signals is 684, and the number of picture element data groups is 684. However, since each of the picture element data groups will be made up from 143 words, there will be 101,916 words in total.

Figure 5:
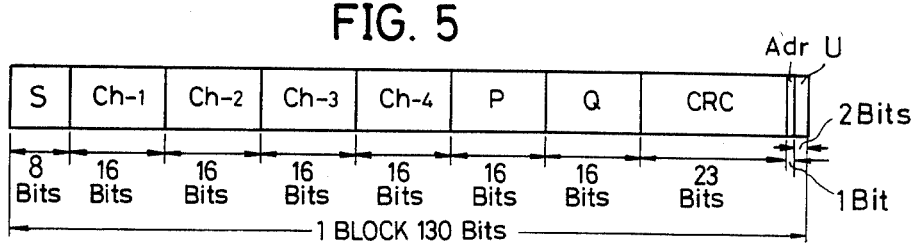
FIG. 5 shows an example of a signal format of a digital signal when the digital video signal shown in FIG. 2 is recorded onto a recording medium together with other signals.

The digital video signal having the signal format shown in FIG. 2, is arranged within one block signal shown in FIG. 5 in terms of one or two words, from the left to the right in FIG. 2. The digital video signal is recorded on the recording medium in terms of this one block. In FIG. 5, one block is made up of 130 bits. A synchronizing signal S having an 8-bit fixed pattern, is at the beginning of one block. Positions where each one word of the 4-channel digital data is arranged, are represented by Ch-1 through Ch-4. The digital video signal is transmitted by arranging one word of the digital video signal at the position represented by Ch-4, for example. The digital video signal may be transmitted by arranging two words, that is, one word in each of the two positions represented by Ch-3 and Ch-4. The positions Ch-1 through Ch-3, or in the latter case, the positions Ch-1 and Ch-2, which are not occupied by the digital video signal, are used to transmit the digital audio signal. One word of the digital audio signal which is sampled at the sampling frequency 44.1 kHz and quantized, and is made up of 16 bits, is arranged within the positions Ch-1 through Ch-3, or in the latter case, the positions Ch-1 and Ch-2.

Positions where two kinds of 16-bit error code correction signals are arranged, are represented by P and Q. These error code correction signals are used upon reproduction to correct code errors in the digital data which are arranged within the positions Ch-1 through Ch-4 and transmitted. A position where a 23-bit error code detection signal is arranged, is represented by CRC. This error code detection signal is used upon reproduction to detect existence of a data error within the block. Further, a position where one bit of a 196-bit signal which is used for random access and the like is arranged, is represented by Adr. All of the 196 bits in this 196-bit signal is thus transmitted by 196 blocks.

A position where a so-called 2-bit user's bits are arranged, is represented by U. The user's bits are spare bits. Therefore, the signal of one block shown in FIG. 5 is made up of a total of 130 bits including the synchronizing signal S through the user's bits U, and the digital signal is time-sequentially transmitted in terms of such blocks at the same frequency as the sampling frequency of 44.1 kHz of the digital audio signal, for example. The transmitted digital signal is passed through a modulator and a recording apparatus which uses a laser beam, and finally recorded on the disc. Thus, if the rotational speed of the disc is 900 rpm, 2940 blocks are recorded or reproduced in one revolution of the disc. This means that the 196-bit signal is recorded or reproduced fifteen times in one revolution of the disc.

In the modulator 18, the digital signal having the signal format shown in FIG. 5 is subjected to modified frequency modulation (MFM) or randomized by use of a maximum length sequence and carrying out a modulo-2 addition, for example, and thereafter formed into a frequency modulated signal by frequency-modulating a carrier of 7 MHz, for example. In addition, the recording apparatus forms a first modulated light beam which is obtained by modulating the frequency modulated signal from the modulator, and a second modulated light beam which is modulated by a first tracking control signal fp1 or a second tracking control signal fp2. The first and second modulated light beams are focused on a photosensitive layer which is formed on a disc. A stamper disc is formed by carrying out known developing and disc manufacturing processes. A disc 20 shown in FIG. 6 is duplicated from this stamper disc.

The disc 20 is recorded with the frequency-modulated signal of the signal which is obtained by time-sequentially multiplexing the digital audio signals and the digital video signals in terms of blocks where one block has the signal format shown in FIG. 5. This frequency-modulated signal is recorded on a spiral main track on the disc 20 as rows of intermittent pits. The first and second tracking control signals fp1 and fp2 of a constant frequency within a band lower than the band of the above frequency-modulated signal, are alternately recorded as rows of intermittent pits on subtracks at substantially intermediate parts between centerlines of mutually adjacent main tracks for each track turn of the disc 20. Further, a third tracking control signal fp3 is recorded on the main track at parts where the sides on which the first and second tracking control signals fp1 and fp2 are recorded change over. Tracking grooves for guiding a reproducing stylus are not formed on the disc 20, and the disc 20 has an electrode function.

The disc 20 is placed onto a turntable (not shown) and rotated at a rotational speed of 900 rpm. A bottom of a reproducing stylus 21 slides over the surface of the rotating disc 20. The reproducing stylus 21 is fixed to one end of a cantilever 22, and a permanent magnet 23 is fixed to the other base end of the cantilever 22. The part of the cantilever 22 where the permanent magnet 23 is fixed, is encircled by a tracking coil 24 and a jitter compensation coil 25 fixed to the reproducing apparatus. The tracking coil 24 generates a magnetic field along a direction perpendicular with respect to the magnetic direction of the permanent magnet 23. Accordingly, the cantilever 22 is moved along one of the directions in the width direction of the track according to the polarity of a tracking error signal from a tracking servo circuit 26 with a displacing quantity according to the magnitude of the tracking error signal.

A high-frequency reproduced signal is obtained from a pickup circuit 27. This pickup circuit 27 comprises a resonance circuit which is varied of its resonance frequency in response to the variations in electrostatic capacitance formed between an electrode fixed to a rear surface of the reproducing stylus 40 by deposition and the disc 20 according to the rows of intermittent pits, a circuit for applying a signal of a constant frequency to this resonance circuit, a circuit for amplitude-detecting a high-frequency signal from the resonance circuit varying in its amplitude according to the above variations in the electrostatic capacitance, and a circuit for preamplifying the amplitude-detected high-frequency signal (reproduced signal). The high-frequency signal obtained from the pickup circuit 26 is supplied to a frequency demodulating circuit 28 wherein the main information signal (the digital audio signals and the time-sequentially multiplexed digital video signal in this case) from the main track is demodulated on one hand, and a part thereof is separated and supplied to the tracking servo circuit 26.

The tracking servo circuit 26 frequency-selects and obtains the first through third tracking control signals fp1 through fp3 from the reproduced signal. Envelopes of the first and second tracking control signals fp1 and fp2 thus obtained are detected and passed through a differential amplifier (not shown) to obtain the tracking error signal, and this tracking error signal is supplied to the tracking coil 24. Here, it must be noted that the positional relationships between the first and second tracking control signals fp1 and fp2 with respect to the main track, changes for each track turn of the disc 20. Accordingly, the tracking polarity is reversed for each track turn of the disc 20, by a switching pulse produced according to the detection or reproduction of the third tracking control signal fp3. The tracking servo circuit 26 drives the tracking coil 24 so that the reproducing stylus 21 is forcibly kicked and shifted by one or more than track pitch along the track width direction according to a kick instruction signal, when the kick instruction signal is applied to an input terminal 29.

On the other hand, the demodulated digital signal obtained from the frequency demodulator 28 is applied to a decoder 30 wherein the demodulated digital signal is subjected to MFM demodulation and formed into the time-sequentially multiplexed signal having the signal format shown in FIG. 5. The beginning of the block of the time-sequentially multiplexed signal is detected according to the synchronizing signal bits S, and the series signal is converted into a parallel signal, and furthermore, the error is detected. The error code correction signals P and Q are used to correct the error and restore the signal only when an error is detected. Hence, by correcting the error and restoring the signal according to the needs, two channels of the 16-bit digital audio signals including no errors among the four channels of 16-bit digital signals restored to their original order with interleaving signal arrangement, are converted into analog audio signals by a digital-to-analog (D/A) converter within the decoder 30 and produced through output terminals 31a and 31b. In addition, the pickup control signal is supplied to a predetermined circuit (not shown) for carrying out high-speed search and the like.

For example, the digital video signal having the signal format shown in FIG. 2 and FIG. 3 which is time-sequentially reproduced from the third and fourth channels, is supplied to a converting circuit 32 for converting the number of scanning lines. The number of scanning lines is converted into 525 lines from 625 lines at the converting circuit 32.

The scanning line number converting circuit 32 is only needed in the reproducing apparatus where it is necessary to reproduce and produce an analog color video signal in accordance with the NTSC system which is a 525-line system, and there is no need for the scanning line number converting circuit 32 in reproducing apparatuses where it is only necessary to reproduce and produce an analog color video signal in accordance with the PAL system or the SECAM system which are 625-line systems. However, a switch for switching the input and output of the scanning line number converting circuit 32 may be provided in some reproducing apparatuses. In such reproducing apparatuses, the switch can be switched to make the scanning line number converting circuit 32 operative or inoperative according to the number of scanning lines of the television system. The output picture element data of the scanning line number converting circuit 32 is supplied to a frame memory 34 or 35 through a switching circuit 33.

The digital video signal successively obtained time-sequentially from the decoder 30 with the signal format shown in FIG. 2, is supplied to a synchronizing signal detecting circuit 36, a header signal detecting circuit 37, and a memory write controller 38. The synchronizing signal detecting circuit 36 detects the synchronizing signal within the header signal, and supplies a detection signal to a control circuit 39. The header signal detecting circuit 37 discriminates each of the codes and address signal within the header signal, and supplies a resulting output to the control circuit 39.

The control circuit 39 is supplied with signals such as a synchronizing signal detection signal from the synchronizing signal detecting circuit 38, detection signals of each of the codes within the header signal obtained from the header signal detecting circuit 37, and a signal (category number signal) specifying the desired category (various kinds of special picture identified by the picture category identification code "P.G") selected by the user of the reproducing apparatus and applied to an input terminal 40 by manipulating an external switch and the like. The control circuit 39 discriminates each of the signals supplied thereto, and controls the scanning line number converting circuit 32, the switching circuit 33, the memory write controller 38, a switching circuit 42, and the like.

The memory write controller 38 carries out control so that the picture element data within the digital video signal which is supplied to the frame memory 34 or 35, is written into a predetermined address according to the address signal within the header signal. However, the memory write controller 38 carries out control so that the header signal is not written in the field memory. The switching circuit 33 is switched over to connect to a contact a or b by the control signal from the control circuit 39, in accordance with the write-in specifying code within the header signal. Thus, the digital video signal is supplied to the frame memory 34 or 35 which is specified by the write-in specifying code.

The frame memories 34 and 35 simultaneously read out the reproduced picture element data which are written in according to a read-out control signal from a memory read controller and synchronizing signal generator 41, and also compensate for the jitter introduced upon reproduction. The digital luminance signals read out from the frame memories 34 and 35 are read out with a sampling frequency of 9 MHz and a quantization number of 8 bits with respect to one picture, and the first and second digital color difference signals read out from the frame memories 34 and 35 are read out with a sampling frequency of 2.25 MHz and a quantization number of 8 bits with respect to one picture. The digital luminance signal and the first and second digital color difference signals thus read out from the frame memories 34 and 35, are supplied to the switching circuit 42.

The switching circuit 42 selectively produces the picture element data according to the read-out specifying code within the header signal. The picture element data of the digital luminance signal is thus supplied to a digital-to-analog (D/A) converter 43, and the picture element data of the two kinds of digital color difference signals are respectively supplied to D/A converters 44 and 45.

The analog luminance signal obtained from the D/A converter 43, the color difference signals (R−Y) and (B−Y) obtained from the D/A converters 44 and 45, the horizontal and vertical synchronizing signals and the color burst signal respectively obtained from the memory read controller and the synchronizing signal generating circuit 41, are respectively supplied to an encoder 46 which produces a color video signal which is in conformance with the NTSC system. The color video signal which is in conformance with the NTSC system, is supplied to a monitoring color television receiver (not shown) through an output terminal 47. The color still picture, partially moving picture, and the like which is displayed on the television receiver, acts as a supplementary information for the listener to enjoy, with respect to the reproduced sound which is obtained by reproducing the audio signals produced through the output terminals 31a and 31b.

In the disc reproducing apparatus described heretofore, the write-in and read-out control apparatus according to the present invention controls the operations of the two frame memories 34 and 35. The write-in and read-out control apparatus according to the present invention comprises the switching circuit 33, the memory write controller 38, the memory read controller within the memory read controller and synchronizing signal generating circuit 41, and the like.

FIGS. 7A and 7B show an embodiment of the write-in and read-out control apparatus according to the present invention. The two frame memories 34 and 35 as a whole comprises twelve memory element groups, however, only eight memory element groups 50-1 through 50-4 and 51-1 through 51-4 are shown in FIG. 7A. The two frame memories 34 and 35 as a whole comprises four memory element groups for storing the picture element data related to the two kinds of color difference signals, in addition to the eight memory element groups 50-1 through 50-4 and 51-1 through 51-4 for storing the luminance picture element data, but the control operation with respect to the four memory element groups which are not shown and the control operation with respect to the eight memory element groups which are shown are basically the same. Therefore, for convenience' sake, only the memory element groups 50-1 through 50-4 and 51-1 through 51-4 are shown. The memory element groups 50-1 through 50-4 and 51-1 through 51-4 are each made up from eight 64k random access memories (RAMs). As described in conjunction with FIG. 3, the picture element data having a quantization number of 8 bits is simultaneously supplied to each of these memory element groups 50-1 through 50-4 and 51-1 through 51-4, through an input terminal 54. In other words, each bit of the picture element data obtained through the input termnial 54, is supplied in parallel to each of the eight RAMs which make up the memory element group 50-1. Similarly, each bit of the picture element data which is obtained through the input terminal 54, is supplied in parallel to each of the eight RAMs in each of the memory element groups 50-2 through 50-4 and 51-1 through 51-4.

According to the present embodiment, the luminance picture element data (hereinafter simply referred to as "picture element data" for convenience' sake) which amount to one field and are read out during the reproducing period of the first field, are stored in the memory element groups 50-1 through 50-4 to occupy half the total memory capacity provided by these memory element groups 50-1 through 50-4. The picture element data which amount to one field and are to be read out during a subsequent reproducing period of the first field when the displayed picture is switched, are stored in the memory element groups 50-1 through 50-4 to occupy the remaining half of the total memory capacity provided by these memory element groups 50-1 through 50-4. Similarly, the picture element data which amount to one field and are read out during the reproducing period of the second field, are stored in the memory element groups 51-1 through 51-4 to occupy half the total memory capacity provided by these memory element groups 51-1 through 51-4. The picture element data which amount to one field and are to be read out during a subsequent reproducing period of the second field when the displayed picture is switched, are stored in the memory element groups 51-1 through 51-4 to occupy the remaining half of the total memory capacity provided by these memory element groups 51-1 through 51-4. Accordingly, in the present embodiment, the frame memory 34 is made up from half the total memory capacity provided by the memory element groups 50-1 through 50-4 and half the total memory capacity provided by the memory element groups 51-1 through 51-4. On the other hand, the frame memory 35 is made up from the remaining half of the total memory capacity provided by the memory element groups 50-1 through 50-4 and the remaining half of the total memory capacity provided by the memory element groups 51-1 through 51-4. Actually, there are four more memory element groups provided with respect to the picture element data related to the two kinds of color difference signals, as described before.

Next, description will be given with respect to the operation of the apparatus according to the present invention during the write-in of the picture element data. As described previously in conjunction with FIG. 1, the luminance picture element data which amount to one frame, is a matrix arrangement of $(114 \times 4)$ picture element data in the horizontal direction and 572 picture element data in the vertical direction. However, in order to simplify the explanation hereinunder, it will be assumed that the picture element data which amount to one frame comprises 64 picture elements, that is, a matrix arrangement of 8 picture element data in the horizontal direction and 8 picture element data in the vertical direction as shown in FIG. 8A. During the write-in of the picture element data of frame-transmission, each of the 64 picture element data shown in FIG. 8A are applied to the input terminal 54 in series, in a sequence in which the picture element data are applied from the top to bottom of the picture from the left to right of the picture. That is, among the picture element data located at positions "1" through "64" in the picture shown in FIG. 8A, the picture element data are applied to the input terminal 54 in a sequence starting from the picture element data located at the position "1"→"9"→"17"→"25"→"33"→"41"→"49"→"57"→'-'2"→"10"→...→"56"→"64".

On the other hand, a synchronizing signal generator (SSG) 55 generates a binary signal (horizontal blanking pulse) which assumes a predetermined level during a period corresponding to a horizontal blanking period H.BLK in the reproduced color video signal which is produced through the output terminal 47 described before, and also generates a binary signal (vertical synchronizing pulse) VD which assumes a predetermined level during a period corresponding to a vertical synchronizing period in this reproduced color video signal. The horizontal blanking pulse is supplied to a first write-in address counter 56 and to a second write-in address counter 57. A signal from the control signal 39, which is obtained by detecting and encoding predetermined codes within the header signal described before, is supplied to both the write-in address counters 56 and 57 through an input terminal 58. At the same time, a signal from the control circuit 39, which is obtained by discriminating the picture information quantity identification code "FR/$\overline{FL}$" within the header signal, is supplied to a driver 60 through an input terminal 59. This signal applied to the input terminal 59, is also supplied to a driver 62 through an inverter 61. The level of the signal applied to the input terminal 59 is low during the frame-transmission, and high during the field-transmission. Hence, during the frame-transmission, the driver 60 is turned ON while the driver 62 is turned OFF to block the incoming signal. As a result, only a write-in address signal which is generated from the write-in address counter 56, is supplied to each of the memory element groups 50-1 through 50-4 and 51-1 through 51-4, through a 15-bit bus.

An address signal supplied to the memory element groups 50-1 through 50-4 and 51-1 through 51-4, is a 16-bit signal. That is, a 1-bit signal from a write-in memory selecting signal generator 63 is added to the 15-bit write-in address signal, as a most significant bit (MSB) of the write-in address signal, to form the 16-bit write-in address signal. A signal from the control circuit 39, which is obtained by discriminating the write-in specifying code "B19W" within the header signal, is supplied to the memory selecting signal generator 63 through an input terminal 64. The memory selecting signal generator 63 generates a high-level signal or a low-level signal according to the signal received through the input terminal 64. This high-level or low-level signal which is generated from the memory selecting signal generator 63, is supplied to each of the memory element groups 50-1 through 50-4 and 51-1 through 51-4 as the MSB of the 16-bit write-in address signal. Accordingly, the input picture element data received through the input terminal 54, are written into the first frame memory 34 which is made up from half the total memory capacity provided by the memory element groups 50-1 through 50-4 and 51-1 through 51-4, or to the second frame memory 35 which is made up from the remaining half of the total memory capacity provided by the memory element groups 50-1 through 50-4 and 51-1 through 51-4, according to the 1-bit signal generated from the memory selecting signal generator 63. Thus, this memory selecting signal generator 63 essentially corresponds to the switching circuit 33 shown in FIG. 6. However, while the switching circuit 33 switches the transmission path of the input picture element data to the frame memories 34 and 35, there is a difference in that the memory selecting signal generator 63 causes the input picture element data to be written into one of the two frame memories 34 and 35 according to the designated write-in address. In any case, the fundamental operations of the switching circuit 33 and the memory selecting signal generator 63 are the same, in that the input picture element data is selectively written into one of the two frame memories 34 and 35.

A signal from the control circuit 39, which indicates that a picture element data is applied to the input terminal 54, is applied to an input terminal 65 shown in FIG. 7B. As a result, a write-in pulse generator 66 shown in FIG. 7B generates one or two pulses among write-in pulses $W_{1a}$ through $W_{4a}$ and $W_{1b}$ through $W_{4b}$ in a sequence which is described hereinafter. That is, when the picture element data located at the position "1" in FIG. 8A is first applied to the input terminal 54, the write-in address counter 56 produces a write-in address signal which indicates an address of decimal value "0", and the write-in pulse generator 66 generates a write-in pulse $W_{1a}$. This write-in pulse $W_{1a}$ which is generated from the write-in pulse generator 66, is only supplied to the memory element group 50-1. Hence, each bit of the picture element data which is located at the position "1", is written at an address "0" in each of the 8 RAMs which make up the memory element group 50-1.

Then, the picture element data located at the position "9" shown in FIG. 8A is applied to the input terminal 54. In this case, while the address counter 56 continues to produce the write-in address signal which indicates the address of the decimal value "0", but the write-in pulse generator 66 generates a write-in pulse $W_{1b}$. This write-in pulse $W_{1b}$ which is generated from the write-in pulse generator 66, is only supplied to the memory element group 51-1. Accordingly, each bit of the picture element data which is located at the position "9", is written at an address "0" in each of the 8 RAMs which make up the memory element group 51-1.

Next, the picture element data located at the position "17" in FIG. 8A is applied to the input terminal 54. In this case, the address counter 56 produces a write-in address signal which indicates an address of a decimal value "2", and the write-in pulse generator 66 generates a write-in pulse $W_{1a}$. This write-in pulse $W_{1a}$ which is generated from the write-in pulse generator 66, is only supplied to the memory element group 50-1. Hence, each bit of the picture element data which is located at the position "17", is written at an address "2" in each of the 8 RAMs which make up the memory element group 50-1. Similarly thereafter, when the picture element data are applied to the input terminal 54 from the picture element data located at the position "25"→"33"→"41"→"49"→"57" in this sequence, the address counter 56 produces a write-in address signal indicating an address which changes from a decimal value "2"→"4"→"4"→"6"→"6" in this sequence, and the write-in pulse generator 66 generates write-in pulses $W_{1b}$→$W_{1a}$→$W_{1b}$→$W_{1a}$→$W_{1b}$ in this sequence. As a result, the picture element data located at the positions "33" and "49" are respectively written at addresses "4" and "6" in each of the 8 RAMs which make up the memory element group 50-1, and the picture element data located at the positions "25", "41", and "57" are respectively written at addresses "2", "4", and "6" in each of the 8 RAMs which make up the memory element group 51-1.

Next, eight picture element data which are located in the second from the leftmost vertical column shown in FIG. 8A, are successively applied to the input terminal 54. However, as described previously in conjunction with FIG. 2, the header signal is transmitted immediately before the picture element data located at the position "2" is applied to the input terminal 54, and the address counter 56, the write-in pulse generator 66, and the write-in memory selecting signal generator 63 are respectively controlled by this header signal. The header signal is transmitted immediately before each of the picture element data located at the positions "1", "2", "3", "4", "5", "6", "7", and "8" are applied to the input terminal 54. Hence, the write-in pulse generator 66 alternately supplies write-in pulses $W_{2a}$ and $W_{2b}$ to the memory element groups 50-2 and 51-2, every time a picture element data is applied to the input terminal 54. On the other hand, the address counter 56 produces a write-in address signal indicating an address which changes from a decimal value "0"→"0"→"2"→"2"→"4"→"4"→"6"→"6" in this sequence, every time a picture element data is applied to the input terminal 54. Accordingly, the picture element data located at the positions "2", "18", "34", and "50" shown in FIG. 8A are respectively written at addresses "0", "2", "4", and "6" in each of the 8 RAMs which make up the memory element group 50-2, and the picture element data located at the positions "10", "26", "42", and "58" shown in FIG. 8A are respectively written at addresses "0", "2", "4", and "6" in each of the 8 RAMs which make up the memory element group 51-2.

Similarly, the picture element data in the third from the leftmost vertical column shown in FIG. 8A, are alternately written into the memory element groups 50-3 and 51-3 at addresses "0", "2", "4", and "6". In addition, the picture element data in the fourth from the leftmost column shown in FIG. 8A, are alternately written into the memory element groups 50-4 and 51-4 at addresses "0", "2", "4", and "6".

Next, the picture element data in the fifth from the leftmost vertical column shown in FIG. 8A, are successively applied to the input terminal 54. However, the header signal is transmitted immediately before the picture element data located at the position "5" shown in FIG. 8A is applied to the input terminal 54. Thus, the address counter 56 produces a write-in address signal indicating an address which changes from a decimal value "1"→"1"→"3"→"3"→"5"→"5"→"7"→"7" in this sequence, every time a picture element data is applied to the input terminal 54. In other words, the address counter 56 produces a write-in address signal indicating an address which is incremented by "2" every time two picture element data are applied to the input terminal 54. On the other hand, the write-in pulse generator 66 generates write-in pulses $W_{1a} \rightarrow W_{1b} \rightarrow W_{1a} \rightarrow W_{1b} \rightarrow W_{1a} \rightarrow W_{1b} \rightarrow W_{1a} \rightarrow W_{1b}$ in this sequence, every time a picture element data is applied to the input terminal 54. As a result, the picture element data located at the positions "5", "21", "37", and "53" shown in FIG. 8A are respectively written at addresses "1", "3", "5", and "7" in each of the 8 RAMs which make up the memory element group 50-1, and the picture element data located at the positions "13", "29", "45", and "61" shown in FIG. 8A are respectively written at addresses "1", "3", "5", and "7" in each of the 8 RAMs which make up the memory element group 51-1. When the picture element data in the sixth from the leftmost vertical column through the eighth from the leftmost vertical column shown in FIG. 8A are successively applied to the input terminal 54, the address counter 56 repeatedly produces a write-in address signal indicating an address which changes from a decimal value "1" and is incremented by "2" every time two picture element data are applied to the input terminal 54, similarly as in the case described above. On the other hand, the write-in pulse generator 66 alternately generates write-in pulses $W_{2a}$ and $W_{2b}$ when the picture element data in the sixth from the leftmost vertical column shown in FIG. 8A are applied to the input terminal 54, alternately generates write-in pulses $W_{3a}$ and $W_{3b}$ when the picture element data in the seventh from the leftmost vertical column shown in FIG. 8A are applied to the input terminal 54, and alternately generates write-in pulses $W_{4a}$ and $W_{4b}$ when the picture element data in the eighth from the leftmost vertical column shown in FIG. 8A are applied to the input terminal 54.

Therefore, the picture element data in the sixth from the leftmost vertical column shown in FIG. 8A are alternately written into the memory element groups 50-2 and 51-2 at addresses "1", "3", "5", and "7". The picture element data in the seventh from the leftmost vertical column shown in FIG. 8A are alternately written into the memory element groups 50-3 and 51-3 at addresses "1", "3", "5", and "7". Further, the picture element data in the eighth from the leftmost vertical column shown in FIG. 8A are alternately written into the memory element groups 50-4 and 51-4 at addresses "1", "3", "5", and "7". As a result, the relationship shown in FIG. 8B exists between the each of the addresses "1" through "7" in the memory element groups 50-1 through 50-4 and 51-1 through 51-4, and each of the stored picture element data. As seen from FIG. 8B, the picture element data which are to be reproduced in the first field are written into the memory element groups 50-1 through 50-4, and the picture element data which are to be reproduced in the second field are written into the memory element groups 51-1 through 51-4. During the write-in operation, the picture element data are written into the memory element groups only during the horizontal blanking period.

Next, description will be given with respect to the control operation which is carried out, when reading out the stored picture element data of frame-transmission from the memory element groups 50-1 through 50-4 and 51-1 through 51-4. The vertical synchronizing pulse VD which is obtained from the SSG 55, is supplied to a read-out address counter 67. In addition, the horizontal blanking pulse H.BLK is inverted of its phase in an inverter 68, and then supplied to the address counter 67. Accordingly, the read-out operation is carried out during the video period. Furthermore, when the vertical synchronizing pulse VD is supplied to the address counter 67, the address counter 67 produces a read-out address signal which indicates an address of decimal value "0". The read-out address signal which is produced from the address counter 67, is supplied to each of the memory element groups 50-1 through 50-4 and 51-1 through 51-4, through a 15-bit bus.

An address signal supplied to the memory element groups 50-1 through 50-4 and 51-1 through 51-4, is a 16-bit signal. That is, a 1-bit signal from a read-out memory selecting signal generator 69 is added to the 15-bit read-out address signal, as a most significant bit (MSB) of the read-out address signal, to form the 16-bit read-out address signal. A signal from the control circuit 39, which is obtained by discriminating the read-out specifying code "B19R" within the header signal, is supplied to the memory selecting signal generator 69 through an input terminal 70. The memory selecting signal generator 69 generates a high-level signal or a low-level signal according to the signal received through the input terminal 70. This high-level or low-level signal which is generated from the memory selecting signal generator 69, is supplied to each of the memory element groups 50-1 through 50-4 and 51-1 through 51-4 as the MSB of the 16-bit read-out address signal. Accordingly, the stored picture element data are read out from the first frame memory 34 which is made up from half the total memory capacity provided by the memory element groups 50-1 through 50-4 and 51-1 through 51-4, or from the second frame memory 35 which is made up from the remaining half of the total memory capacity provided by the memory element groups 50-1 through 50-4 and 51-1 through 51-4, according to the 1-bit signal generated from the memory selecting signal generator 69. Thus, this memory selecting signal generator 69 essentially corresponds to the switching circuit 42 shown in FIG. 6. However, while the switching circuit 42 is designed to selectively produce the read out picture element data which are read out from one of the frame memories 34 and 35, there is a difference in that the memory selecting signal generator 69 causes the stored picture element data to be read out from one of the two frame memories 34 and 35 according to the designated read-out address.

The read-out address signal which is produced from the address counter 67, is commonly supplied to each of the memory element groups 50-1 through 50-4 and 51-1 through 51-4, to make access to each of these memory element groups 50-1 through 50-4 and 51-1 through 51-4. Next, a latch pulse having a predetermined period, is applied to an input terminal 71 and then supplied to each of latch circuits 52-1 through 52-4 and 53-1 through 53-4. The address counter 67 produces a read-out address signal which initially indicates an address of decimal "0" and thereafter indicates an address which is successively incremented by "1". Accordingly, each of the 8-bit picture element data which were stored at the address "0" in the memory element groups 50-1 through 50-4 and 51-1 through 51-4, are first read out and supplied to the latch circuits 52-1 through 52-4 and 53-1 through 53-4. Each of the read out picture element data supplied to the latch circuits 52-1 through 52-4 and 53-1 through 53-4, are latched by the latch pulse which is applied to the input terminal 71. After each of the read out picture element data are latched in the latch circuits 52-1 through 52-4 and 53-1 through 53-4, drive pulses are applied to input terminals 72-1 through 72-4. The latch circuits 52-1 through 52-4 and 53-1 through 53-4 are respectively designed to be driven by a low-level drive pulse. On the other hand, the drive pulse applied to each of the input terminals 72-1 through 72-4, is set so as to assume a high level during the reproducing period of the first field and to assume a low level during the reproducing period of the second field.

During the reproducing period of the first field, high-level drive pulses which are time-divisionally applied to the input terminals 72-1 through 72-4, are respectively supplied to the latch circuits 52-1 through 52-4, through inverters 73-1 through 73-4, so as to produce the latched picture element data from the latch circuits 52-1 through 52-4. The high-level drive pulses are successively and time-divisionally applied to the input terminals 72-1 through 72-4, until a subsequent latch pulse is applied to the input terminal 71. Each of the picture element data located at the positions "1", "2", "3", and "4" shown in FIG. 8A, which were respectively read out from the address "0" in each of the memory element groups 50-1 through 50-4 and latched in each of the latch circuits 52-1 through 52-4, are successively and time-divisionally produced from the latch circuits 52-1 through 52-4 within one period of the latch pulse and then supplied to the D/A converter 43.

Next, when the address indicated by the read-out address signal changes to "1", a latch pulse is applied to the input terminal 71. Thus, each of the picture element data which were stored at the address "1" in the memory element groups 50-1 through 50-4 and 51-1 through 51-4, are read out and latched in the latch circuits 52-1 through 52-4 and 53-1 through 53-4. Then, the latch circuits 52-1 through 52-4 are driven time-divisionally, and each of the picture element data which were read out from the address "1" in each of the memory element groups 50-1 through 50-4 and latched in the latch circuits 52-1 through 52-4, are time-divisionally produced from the latch circuits 52-1 through 52-4 within one period of the latch pulse. The picture element data located at the positions "5", "6", "7", and "8" shown in FIG. 8A which were latched, are time-divisionally produced in a sequence "5"→"6"→"7"→"8" and supplied to the D/A converter 43. The address indicated by the read-out address signal is thereafter successively incremented by "1", and the read-out operations are carried out similarly. Therefore, during the reproducing period of the first field, the picture element data read out from the memory element groups 50-1 through 50-4 are time-divisionally supplied to the D/A converter 43.

When the reproduction of the first field is completed, the read-out address signal which is produced from the address counter 67 again indicates the address "0", in response to the vertical synchronizing pulse VD which is supplied to the address counter 67 from the SSG 55. Thus, reproduction of the second field is started. During the reproduction of the second field, the address indicated by the read-out address signal which is produced from the address counter 67, is successively incremented by "1" from "0" to "7" as in the case of the reproduction of the first field. On the other hand, low-level drive pulses are applied to the input terminals 72-1 through 72-4. As a result, the picture element data which are read out from the memory element groups 51-1 through 51-4 and latched in the latch circuits 53-1 through 53-4, are successively and time-divisionally produced from the latch circuits 53-1 through 53-4.

When the read-out address is "0" during the reproducing period of the second field, the picture element data located at the positions "9", "10", "11", and "12" shown in FIG. 8A which were read out from the address "0" in each of the memory element groups 51-1 through 51-4 and latched, are time-divisionally produced from the latch circuits 53-1 through 53-4 in a sequence "9"→"10"→"11"→"12". When the read-out address is "1" during this reproducing period of the second field, the picture element data located at the positions "13", "14", "15", and "16" shown in FIG. 8A which were read out from the address "1" in each of the memory element groups 51-1 through 51-4 and latched, are similarly produced time-divisionally from the latch circuits 53-1 through 53-4 in a sequence "13"→"14"→"15"→"16". Similarly thereafter, the picture element data located at the positions "25" through "28" shown in FIG. 8A are time-divisionally produced when the read-out address is "2", the picture element data located at the positions "29" through "32" shown in FIG. 8A are time-divisionally produced when the read-out address is "3", the picture element data located at the positions "41" through "44" shown in FIG. 8A are time-divisionally produced when the read-out address is "4", the picture element data located at the positions "44" through "48" shown in FIG. 8A are time-divisionally produced when the read-out address is "5", the picture element data located at the positions "57" through "60" shown in FIG. 8A time-divisionally produced when the read-out address is "6", and the picture element data located at the positions "61" through "64" shown in FIG. 8A are time-divisionally produced when the read-out address is "7". After the picture element data which were read out from the address "7" in each of the memory element groups 51-1 through 51-4 are produced and the reproduction of the second field is completed, the reproduction of the first field is started again.

If the latch pulse applied to the input terminal 71 has a frequency of 2.25 MHz, the picture element data will be read out with a sampling frequency of 9 MHz because four picture element data are time-divisionally read out within one period of the latch pulse.

The picture element data which are time-divisionally supplied to the D/A converter 43 are subjected to the digital-to-analog conversion, and then supplied to the encoder 46 shown in FIG. 6. Hence, as shown in FIG. 8C, the locations of the picture element data which are displayed on the screen are identical to the original locations of the picture element data shown in FIG. 8A. In FIG. 8C, "#1" indicated on the left represent picture element data groups which are displayed during the reproducing period of the first field, and "#2" indicated on the left represent picture element data groups which are displayed during the reproducing period of the second field.

Next, description will be given with respect to the control operations which are carried out when performing write-in and read-out of picture element data of field-transmission. The present invention may also be applied to a case where the picture element data which amount to one field, are solely made up from picture element data related to the first or second field. However, description will hereinafter be given for a case where the write-in and read-out are to be performed with respect to the picture element data of zigzag-transmission shown in FIG. 1, by referring to FIG. 9A.

First, during the write-in operation, the picture element data located at positions "1" through "32" shown in FIG. 9A are applied to the input terminal 54 in a sequence "1"→"9"→"17"→"25"→"5"→"13"→"21"→. . .

→"24"→"32". In addition, the header signal is transmitted immediately before the picture element data located at the positions "1", "2", "3", and "4" are applied to the input terminal 54. This header signal enables detection that the picture element data which is to be written, is a picture element data of field-transmission. Thus, a detection signal indicative of the detected result that the picture element data is a picture element data of field-transmission, is applied to the input terminal 59 to turn the driver 60 OFF and turn the driver 62 ON. Accordingly, the 15-bit address signal from the write-in address counter 56 is supplied to each of the memory element groups 50-1 through 50-4, 51-2, and 51-4, and the 15-bit address signal from the write-in address counter 57 is supplied to each of the memory element groups 51-1 and 51-3. Further, the 1-bit signal from the write-in memory selecting signal generator 63 is commonly supplied to each of the memory element groups 50-1 through 50-4 and 51-1 through 51-4, as the MSB of the 16-bit write-in address signal.

When the picture element data located at the position "1" shown in FIG. 9A is applied to the input terminal 54, the write-in address counter 56 produces an address signal indicating an address "0". Moreover, the write-in pulse generator 66 generates a write-in pulse $W_{1a}$, and supplies this write-in pulse $W_{1a}$ to the memory element group 50-1. Accordingly, the picture element data located at the position "1", is only written at the address "0" in the memory element group 50-1. Next, the picture element data located at the position "9" shown in FIG. 9A is applied to the input terminal 54. In this state, the address counter 56 produces an address signal indicating an address "2", and the address counter 57 produces an address signal indicating an address "0". In addition, the write-in pulse generator 66 generates write-in pulses $W_{1a}$ and $W_{1b}$ simultaneously. As a result, the picture element data located at the position "9", is simultaneously written at the address "2" in the memory element group 50-1 and at the address "0" in the memory element group 51-1.

Next, when the picture element data located at the position "17" shown in FIG. 9A is applied to the input terminal 54, the address counters 56 and 57 respectively produce address signals indicating addresses which are incremented by "2" from the previous addresses. That is, the address counter 56 produces an address signal indicating an address "4", and the address counter 57 produces an address signal indicating an address "2". Furthermore, the write-in pulse generator 66 produce write-in pulses $W_{1a}$ and $W_{1b}$ simultaneously, and supplies the write-in pulse $W_{1a}$ to the memory element group 50-1 and supplies the write-in pulse $W_{1b}$ to the memory element group 51-1. Thus, the picture element data located at the position "17", is simultaneously written at the address "4" in the memory element group 50-1 and at the address "2" in the memory element group 51-1. Similarly, the picture element data located at the position "25" shown in FIG. 9A, is simultaneously written at an address "6" in the memory element group 50-1 and at an address "4" in the memory element group 51-1.

Thereafter, the picture element data in the second from the leftmost vertical column in FIG. 9A, which are solely made up from picture element data related to the second field, are successively applied to the input terminal 54. First, when the picture element data located at the position "5" shown in FIG. 9A is applied to the input terminal 54, the address counter 56 produces an address signal indicating an address "0". The write-in pulse generator 66 generates write-in pulses $W_{2a}$ and $W_{2b}$ simultaneously, and supplies the write-in pulse $W_{2a}$ to the memory element group 50-2 and supplies the write-in pulse $W_{2b}$ to the memory element group 51-2. As a result, the picture element data located at the position "5", is simultaneously written at the address "0" in the memory element group 50-2 and at the address "0" in the memory element group 51-2. While the picture element data in the second from the leftmost vertical column in FIG. 9A are successively applied to the input terminal 54, the write-in pulse generator 66 generates the write-in pulses $W_{2a}$ and $W_{2b}$ simultaneously, and the address counter 56 produces an address signal indicating an address which is successively incremented by "2" every time a picture element data is applied to the input terminal 54. Accordingly, the picture element data located at the position "13" shown in FIG. 9A is simultaneously written at the same address "2" in the memory element groups 50-2 and 51-2, the picture element data located at the position "21" is simultaneously written at the same address "4" in the memory element groups 50-2 and 51-2, and the picture element data located at the position "29" is simultaneously written at the same address "6" in the memory element groups 50-2 and 51-2.

Next, the picture element data in the third from the leftmost vertical column shown in FIG. 9A, which are solely made up from picture element data related to the first field, are successively applied to the input terminal 54. First, when the picture element data located at the position "2" shown in FIG. 9A is applied to the input terminal 54, the address counter 56 produces an address signal indicating an address "0". Moreover, the write-in pulse generator 66 only generates a write-in pulse $W_{3a}$. As a result, the picture element data located at the position "3", is only written at the address "0" in the memory element group 50-3. From the time when the remaining picture element data in the third from the leftmost vertical column shown in FIG. 9A are successively applied to the input terminal 54 starting from the picture element data located at the position "10", the address counters 56 and 57 respectively produce address signals indicating addresses which are successively incremented by "2" every time a picture element data is applied to the input terminal 54, where the address signal produced from the address counter 57 always indicates an address which is less than the address indicated by the address signal produced from the address counter 56 by "2". On the other hand, the write-in pulse generator 66 generates write-in pulses $W_{3a}$ and $W_{3b}$ simultaneously. As a result, the picture element data located at the positions "10", "18", and "26" are respectively written at addresses "2", "4", and "6" in the memory element group 50-3, and the picture element data located at the positions "10", "18", and "26" are also written at addresses "0", "2", and "4" in the memory element group 51-3.

Similarly, when the picture element data in the odd vertical columnm from the leftmost vertical column shown in FIG. 9A are successively applied to the input terminal 54, the address counters 56 and 57 respectively produce address signals indicating addresses which are successively incremented by "2" every time a picture element data is applied to the input terminal 54, where the address signal produced from the address counter 57 always indicates an address which is less than the address indicated by the address signal produced from the address counter 56 by "2". However, when the picture element data in the fifth and seventh from the leftmost vertical column shown in FIG. 9A are applied to the input terminal 54, the initial address indicated by the address signal is "1". On the other hand, the write-in pulse generator 66 generates write-in pulses $W_{1a}$ and $W_{1b}$ simultaneously when the picture element data in the first and fifth from the leftmost vertical column shown in FIG. 9A are applied to the input terminal 54, and generates write-in pulses $W_{3a}$ and $W_{3b}$ simultaneously when the picture element data in the third and seventh from the leftmost vertical column shown in FIG. 9A are applied to the input terminal 54. However, the write-in pulse generator 66 only generates the write-in pulse $W_{1a}$ or $W_{3a}$ when the first picture element data (located at the positions "1", "2", "3", and "4" shown in FIG. 9A) in the odd vertical columns from the leftmost vertical column is applied to the input terminal 54.

On the other hand, when the picture element data in the even vertical column from the leftmost vertical column shown in FIG. 9A are successively applied to the input terminal 54, only the address signal from the address counter 56 indicating an address which is successively incremented by "2" every time a picture element data is applied to the input terminal 54, is used. However, when the picture element data in the second and fourth from the leftmost vertical column shown in FIG. 9A are applied to the input terminal 54, the initial address indicated by the address signal is "0". The initial address indicated by the address signal is "1" when the picture element data in the sixth and eighth from the leftmost vertical column shown in FIG. 9A are applied to the input terminal 54. In addition, the write-in pulse generator 66 generates write-in pulses $W_{2a}$ and $W_{2b}$ simultaneously when the picture element data in the second and sixth from the leftmost vertical column are applied to the input terminal 54, and generates $W_{4a}$ and $W_{4b}$ simultaneously when the picture element data in the fourth and eighth from the leftmost vertical column are applied to the input terminal 54. As a result, the relationships between the addresses "1" through "7" in each of the memory element groups 50-1 through 50-4 and 51-1 through 51-4, and each of the stored picture element data, become as shown in FIG. 9B.

Next, description will be given with respect to the operation to read out the stored picture element data of zigzag-transmission from the memory element groups 50-1 through 50-4 and 51-1 through 51-4. The control with respect to the read-out operation, is exactly the same as the control with respect to the read-out of the picture element data of frame-transmission which was described previously. In other words, the read-out address counter 67 produces an address signal indicating an address which is successively incremented by "1", to indicate addresses "0" through "7". Further, the stored picture element data are time-divisionally read out from the memory element groups 50-1 through 50-4 only during the reproducing period of the first field, and the stored picture element data are time-divisionally read out from the memory element groups 51-1 through 51-4 only during the reproducing period of the second field.

As a result, the reproduced picture element data are displayed on the monitoring screen at locations shown in FIG. 9C. During the reproducing period of both the first and second fields, the picture element data related to both the first and second fields are alternately arranged on each of the scanning lines. Further, the combination of the arranged picture element data is different during the reproducing period of the first field and the reproducing period of the second field. In FIG. 9C, "#1" indicated on the left represent picture element data groups which are displayed during the reproducing period of the first field, and "#2" indicated on the left represent picture element data groups which are displayed during the reproducing period of the second field.

When displaying the partially moving picture described before, the picture element data of frame-transmission which amount to one frame and are stored in the frame memory from which the read-out is being carried out, are partially replaced by picture element data of field-transmission which relate to the partially moving picture. According to the present embodiment, the discrimination to determine whether the input picture element data are picture element data of frame-transmission or of field-transmission, is performed based on the code "FR/$\overline{FL}$" within the header signal. If the input picture element data are picture element data of field-transmission, the input picture element data of field-transmission are written into the frame memory so that the picture element data of field-transmission will be read out from the frame memory with the same read-out sequence with which picture element data of frame-transmission would be read out from the frame memory, according to the discrimination result based on the code "FR/$\overline{FL}$". Therefore, it is completely unnecessary to discriminate whether the stored picture element data which are to be read out from the frame memory, are picture element data of field-transmission or of frame-transmission. Consequently, the read-out operation can always be carried out in a predetermined read-out sequence.

The picture element data of frame-transmission may be written into the frame memory as shown in FIG. 10. In this case, memory element groups 50-2 and 51-2 and the memory element groups 50-4 and 51-4 in the embodiment shown in FIG. 7, are interchanged.

In the embodiment described heretofore, the 8-bit picture element data was simultaneously supplied to each of the memory element groups 50-1 through 50-4 and 51-1 through 51-4, through the input terminal 54. However, the 8-bit picture element data may be supplied to only the memory element groups which require the input picture element data, by applying a write-in address signal in common to each of the memory element groups and selectively switching the input picture element data.

When the picture element data which consist of the number shown in FIG. 1 are actually written into the frame memory, the write-in address signal indicates an address which is incremented by "0072" in hexadecimal every time two picture element data are applied to the input terminal 54 in the case of frame-transmission, and every time one picture element data is applied to the input terminal 54 in the case of field-transmission.

Further, the present invention is not limited to these embodiments, but various variations and further modifications may be made without departing from the scope of the present invention.

What is claimed is

1. A write-in and read-out control apparatus for controlling write-in and read-out of picture element data with respect to a memory circuit, said memory circuit having a memory capacity capable of storing picture element data amounting to one frame and being selectively supplied with picture element data of frame-transmission and picture element data of field-transmission, said frame-transmission being a transmission of all picture element data which are related to a displaying area within a total display area of one picture, said picture element data of frame-transmission amounting to one frame or less according to the size of said displaying area with respect to said total display area, said field-transmission being a transmission of half of the picture element data which are related to the displaying area within the total display area of said one picture, said picture element data of field-transmission amounting to one field or less according to the size of said displaying area with respect to said total display area, said write-in and read-out control apparatus comprising:

input terminal means successively applied with input picture element data, said input terminal means being coupled to said memory circuit;

an address signal generating means for generating an address signal which successively indicates write-in addresses in a first memory region corresponding to one field within said memory circuit into which picture element data which are to be reproduced in a first field among said input picture element data are written, and generating an address signal which successively indicates write-in addresses in a second memory region corresponding to one field within said memory circuit into which picture element data which are to be reproduced in a second field are written, when said picture element data of frame-transmission are successively applied to said input terminal means as said input picture element data, and for generating two address signals which respectively and successively indicate write-in addresses in the first and second memory regions into which said picture element data of field-transmission are written, when said picture element data of field-transmission are successively applied to said input terminal means as said input picture element data;

write-in pulse generating means for generating at least one write-in pulse when said picture element data of frame-transmission are successively applied to said input terminal means every time one of said input picture element data is applied to said input terminal means, to supply the generated write-in pulse to said memory circuit and write said input picture element data into said memory circuit, and for generating one or two write-in pulses when said picture element data of field-transmission are successively applied to said input terminal means every time one of said input picture element data is applied to said input terminal means, to supply the generated write-in pulse or pulses to said memory circuit and write said input picture element data into said memory circuit; and read-out control means for generating a read-out address signal and supplying the generated read-out address signal to said memory circuit, said read-out address indicating an address which is incremented by a predetermined integer regardless of whether stored picture element data in said memory circuit are picture element data of frame-transmission or field-transmission, so that the stored picture element data are read out from said first memory region during a reproducing period of the first field and so that the stored picture element data are read out from said second memory region during a reproducing period of the second field.

2. A write-in and read-out control apparatus as claimed in claim 1 in which said picture element data of frame transmission are successively transmitted time-divisionally in a sequence such that picture element data arranged in vertical columns in a picture are transmitted horizontally, said address signal generating means generates a write-in address signal indicating an address which is incremented by a predetermined integer every time two picture element data which are displayed at the same vertical location in the picture are applied to said input terminal means, and said two picture element data are written at the same address in each of said first and second memory regions within said memory circuit.

3. A write-in and read-out control apparatus as claimed in claim 1 in which said picture element data of field-transmission are picture element data which are to be arranged in a checkered pattern among picture element data which are arranged in a matrix pattern and make up one picture.

4. A write-in and read-out control apparatus as claimed in claim 1 in which said picture element data of field-transmission are picture element data which are to be arranged in a checkered pattern among picture element data which are arranged in a matrix pattern and make up one picture, and are successively transmitted time-divisionally in a sequence such that picture element data arranged in vertical columns in a picture are transmitted horizontally, said address signal generating means comprises first and second address counters which respectively generate write-in address signals indicating addresses which mutually differ by a predetermined integer and are respectively incremented by a predetermined integer every time a picture element data is applied ro said input terminal means, and means for supplying said write-in address signal generated from said first and second address counters to said memory circuit, said write-in pulse generating means generates a write-in pulse so that only a first picture element data among picture element data displayed at the same vertical locations in the picture is written into said first memory region according to the write-in address signal from said first address counter when picture element data in odd vertical columns and related to the first field are applied to said input terminal means and so that a second and subsequent picture element data are simultaneously written into said first and second memory regions according to the address signals from said first and second address counters, and generates a write-in pulse so that picture element data in even vertical columns and related to the second field are simultaneously written into said first and second memory regions according to the address signals from said first and second address counters when the picture element data in the even vertical columns and related to the second field are applied to said input terminal means.

5. A write-in and read-out control apparatus as claimed in claim 1 in which said picture element data of frame-transmission and said picture element data of field-transmission which are supplied to said memory circuit, are signals reproduced from the same recording medium.

* * * * *